US006234628B1

United States Patent
Friedman

(10) Patent No.: US 6,234,628 B1
(45) Date of Patent: May 22, 2001

(54) ENCLOSED SPRING BRIDGE MECHANISM FOR CLIP-ON SUNGLASSES

(76) Inventor: Dean Friedman, 61 Ulster Ave., Atlantic Beach, NY (US) 11509

( * ) Notice: Subject to any disclaimer, the term of this patent is extended or adjusted under 35 U.S.C. 154(b) by 0 days.

(21) Appl. No.: 09/480,564

(22) Filed: Jan. 10, 2000

(51) Int. Cl.$^7$ .................................................. G02C 9/00
(52) U.S. Cl. ................................ 351/48; 351/58; 351/128
(58) Field of Search ................................ 351/47, 48, 57, 351/58, 124, 128

(56) References Cited

U.S. PATENT DOCUMENTS

| D. 350,359 | 9/1994 | Friedman | D16/334 |
|---|---|---|---|
| 1,571,848 | * 2/1926 | Lobenstein | 351/48 |
| 1,720,548 | * 7/1929 | Gilkerson | 351/48 |
| 2,206,880 | * 7/1940 | Cozzens | 351/48 |
| 2,926,563 | * 3/1960 | Lockwood | 351/47 |
| 3,575,497 | 4/1971 | LeBlanc | 351/47 |
| 5,164,749 | 11/1992 | Shelton | 351/47 |
| 5,258,786 | 11/1993 | Penrod | 351/47 |
| 5,710,614 | * 1/1998 | Cereda | 351/48 |
| 5,801,804 | * 9/1998 | Pennise | 351/47 |
| 5,953,096 | 9/1999 | Friedman | 351/47 |

* cited by examiner

Primary Examiner—Huy Mai
(74) Attorney, Agent, or Firm—Robert L. Epstein; Harold James; James & Franklin, LLP

(57) ABSTRACT

The clip-on sunglass assembly mounts on eyeglasses and has mirror image frame parts. Each includes a lens retaining frame portion with a set of protruding "L" shaped eyeglass engaging prongs and a bridge element. A mechanism is provided for connecting the bridge elements for movement between a proximate position, where the frame parts are relatively close to each other, and a remote position, where the frame parts are relatively far from each other. The connecting mechanism includes at least one coil spring situated within a cylindrical enclosure. The enclosure has an open end which receives the bridge element of one frame part. The spring is operably situated between the end of the bridge element and the interior wall of the enclosure adjacent the open end. The spring normally biases the frame parts toward each other such that the prongs securely engage the eyeglass frame.

17 Claims, 2 Drawing Sheets

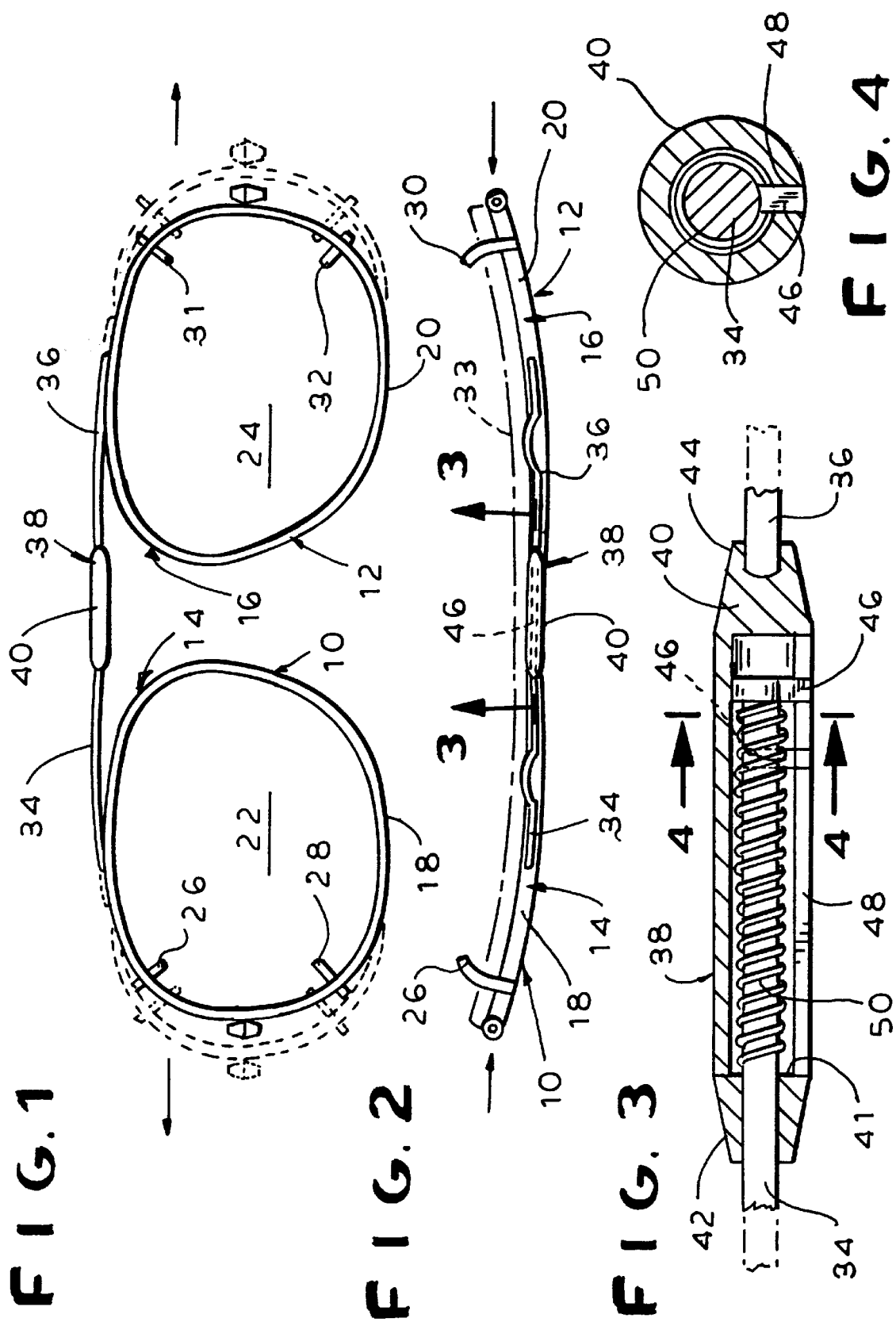

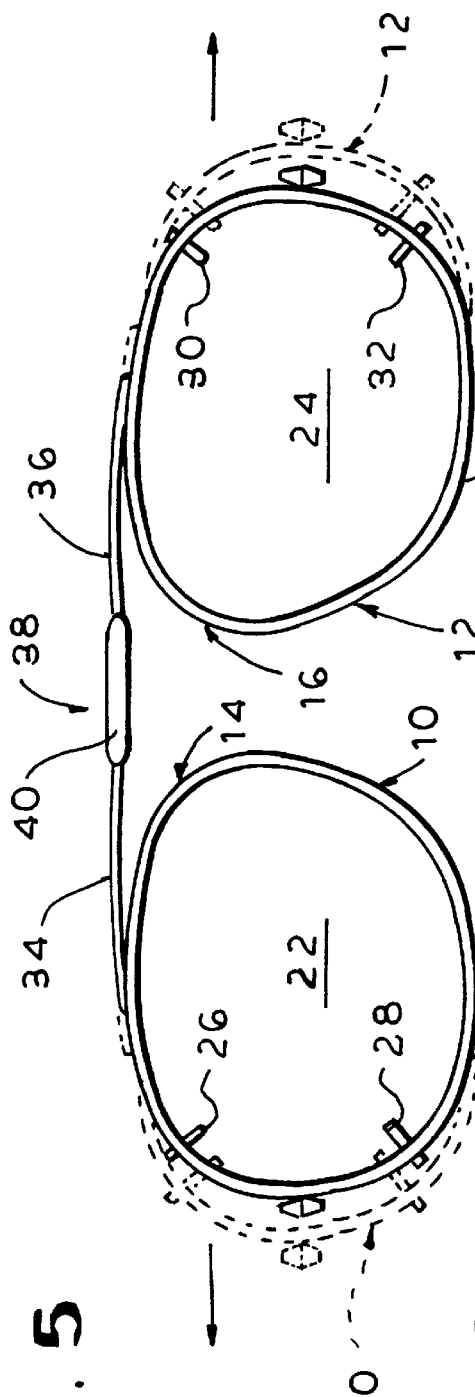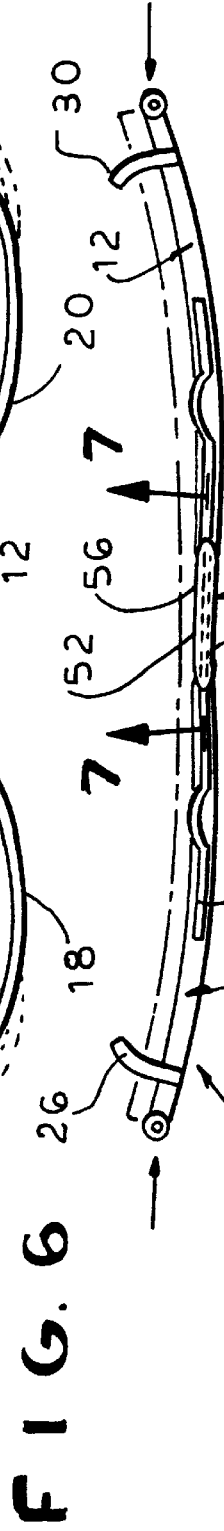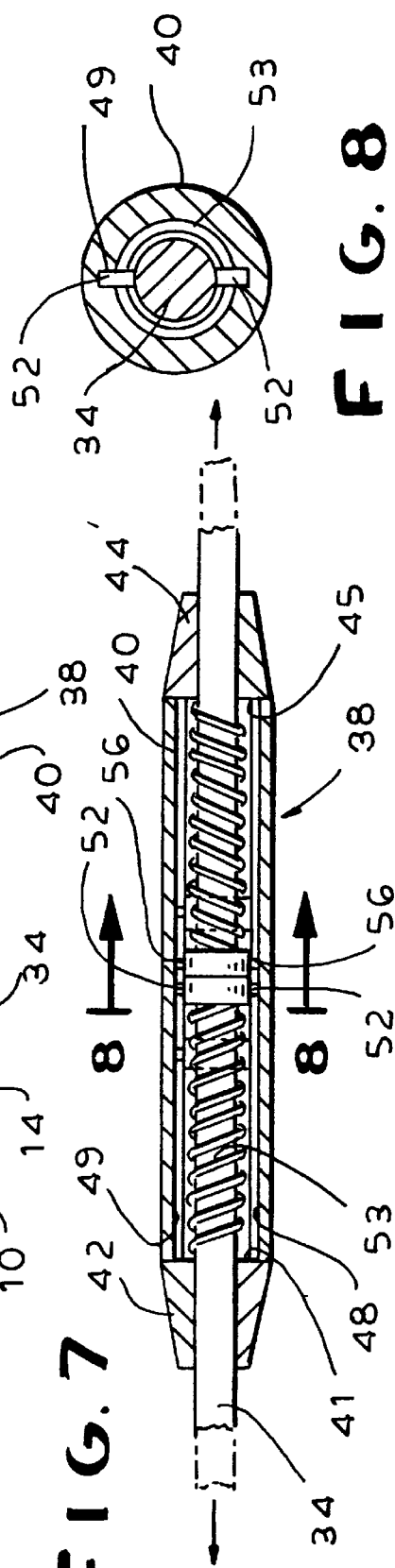

ENCLOSED SPRING BRIDGE MECHANISM FOR CLIP-ON SUNGLASSES

The present invention relates to a clip-on sunglass assembly and more particularly to an enclosed spring bridge mechanism for a clip-on sunglass assembly which permits the assembly to be easily and securely mounted on eyeglasses.

A clip-on sunglass assembly consists of a metal or plastic frame which carries a pair of light attenuating plastic or glass lenses. A mechanism is provided to permit the assembly to be removably mounted on eyeglasses.

In order to be commercially acceptable, the clip-on sunglass assembly must be light in weight, reasonably rugged and relatively inexpensive. It must also be easy to mount on and remove from the eyeglasses. Further, it must mount without damaging the eyeglasses, particularly the lenses.

One common type of mounting mechanism is a clamp which is attached to the bridge of the sunglass assembly. It includes pairs of opposing prongs which are spring loaded toward each other so as to retain the lenses of the eyeglasses between the prongs. Examples of this clamp-type mechanism are disclosed in U.S. Pat. No. 3,575,497 issued Apr. 20, 1971 to Leblanc, U.S. Pat. No. 5,164,749 issued Nov. 17, 1992 to Shelton and U.S. Design Pat. No. Des 350,359 issued Sep. 6, 1994 to Friedman.

However, clamp-type mechanisms have their disadvantages. The prongs must clamp tightly to the lenses, potentially scratching the lenses. The mechanism may obstruct the view partially. Moreover, this type of mechanism has several inter-engaging parts which must be fabricated precisely and assembled, making it relatively expensive and not always unreliable.

In order to overcome these drawbacks, I developed a spring bridge mechanism for mounting a clip-on sunglasses assembly which does not contact or clamp the lenses of the eyeglasses and therefore cannot scratch them. The mechanism utilizes one or more sets of exposed spring loaded prongs. The prongs are movably or flexibly mounted on the sunglass frame assembly such that they can be moved against a spring force, for insertion between spaced portions of the eyeglasses frame. The spring force causes the prongs to frictionally engage the eyeglass frame. Because the prongs only touch the frame, the lenses of the eyeglasses are not clamped or otherwise engaged. I received U.S. Pat. No. 5,953,096 entitled "Universal Center Bridge Mounting Mechanism for Clip-On Sunglasses" on Sep. 14, 1999 for that mechanism.

Another type of clip-on sunglass frame assembly consists of mirror image frame parts, each of which carries a lens. The frame parts are connected together by a bridge mechanism which includes a metal coil spring. The mechanism permits the frame parts to move away from each other as the spring is compressed. Each frame part, at its outer extremity, is provided with a set (typically two or three) eyeglass frame engaging prongs. When the frame parts are moved away from each other, against the force of the spring, the eyeglass frame can be inserted between the prong sets. Releasing the frame parts permits the spring to move frame parts toward each other, such that the eyeglass frame is securely retained between the prong sets.

One problem inherent in this type of spring bridge mechanism is that the coil spring is exposed. Aside from being unsightly, this is undesirable because bits of solid debris and other particulate foreign matter can enter between the coils to jam the mechanism or distort the spring. Liquid, such as rain or sweat, can enter the mechanism resulting in rusting or deterioration of the parts. Further, the skin, hair and eyebrows of the user are not protected from the exposed spring and can be pinched by the spring.

Another problem involved with having lens carrying frame parts which are moveable relative to each other relates to the linear alignment of the lenses. Since the lenses are polarized, it is important that proper linear alignment of the lenses be maintained. This requires the bridge mechanism to include a means for maintaining proper linear alignment between the lenses.

My invention overcomes these problems by enclosing the coil spring of the bridge mechanism within a slender cylindrical enclosure. The enclosure isolates the spring from the skin and hair of the wearer and prevents debris and liquids from reaching the spring.

The enclosure serves the additional purpose of cooperating with the bridge elements of the frame parts to keep the frame parts in proper alignment. This is achieved by one or more slots in the enclosure which cooperate with protrusions on the bridge elements to maintain the frame parts in alignment. The enclosure interior wall also provides an end surface for the spring to abut.

The enclosure enhances the appearance of the assembly by hiding the unsightly spring and the bridge element ends. Preferably, the enclosure is made of the same material and finish as the bridge elements and frame, resulting in a mechanism which is much less conspicuous than an exposed spring.

It is, therefore, a prime object of the present invention to provide a spring bridge mechanism for a clip-on sunglass assembly in which the spring is fully enclosed.

It is another object of the present invention to provide an enclosed spring bridge mechanism for a clip-on sunglass assembly which has an attractive appearance.

It is another object of the present invention to provide an enclosed spring bridge mechanism for a clip-on sunglass assembly which is much less conspicuous than conventional mechanisms of this type.

In accordance with the present invention, a sunglass assembly for eyeglass is provided including first and second frame parts. Each frame part includes a lens retaining portion with a set of protruding eyeglass engaging prongs and a bridge element. Means are provided connecting the bridge elements for movement between a proximate position, wherein the frame parts are relatively close to each other, and a remote position, wherein the frame parts are relatively far from each other. The connecting means includes a spring and a substantially cylindrical enclosure having at least one open end through which the bridge element of one frame part extends. The spring is situated within the enclosure. The spring is operably interposed between the end of the bridge element and the enclosure wall. The spring normally biases the frame parts towards the proximate position. Means are provided for attaching the bridge element of the other frame part to the enclosure.

The attaching means may include an opening in the other end of the enclosure into which the bridge element of the other frame part extends. In this preferred embodiment, a second spring is situated within the enclosure. It is operably interposed between the end of the bridge element of the other frame part and the enclosure wall.

The enclosure has a slot. The end of the bridge element carries a protrusion which extends into the slot. The spring is operably interposed between the protrusion and the enclosure.

The end of the bridge element of the other frame part also has a protrusion which extends into a slot. The second spring is operably interposed between the protrusion on the end of the bridge element of the other frame part and the enclosure wall.

One open end of the enclosure may be tapered. The spring abuts the tampered end. The other open end of the enclosure may also be tapered. The second spring abuts the tapered other end.

In accordance with another aspect of the present invention, a sunglass assembly is provided for mounting on eyeglasses. The assembly includes first and second fame parts. Each part includes a lens retaining portion with at least one eyeglass engaging prong and a bridge element. Means are provided connecting the bridge elements for movement between a proximate position, wherein the frame parts are relatively close to each other, and a remote position, wherein the frame parts are relatively far from each other. The connecting means includes a substantially cylindrical enclosure having open ends through which the bridge elements of the respective frame parts extend. A first spring is situated within the enclosure and operably interposed between the end of the bridge element of the first frame part and the enclosure. A second spring is situated within the enclosure and operably interposed between the end of bridge element of the second frame part and the enclosure. The springs normally bias the frame parts towards the proximate position.

To these and to such other objects which hereinafter appear, the present invention relates to an enclosed spring bridge mechanism for a clip-on sunglass assembly as set forth in detail in the following specification and recited in the annexed claims, taken together with the accompanying drawings, in which like numerals refer to like parts and in which:

FIG. 1 is a front plan view of a first preferred embodiment of the assembly of the present invention showing the frame parts in the proximate position in solid and in the remote position in phantom;

FIG. 2 is a top plan view of the embodiment of the invention shown in FIG. 1 mounted on eyeglasses;

FIG. 3 is an enlarged cross-sectional view taken along line 3—3 of FIG. 2;

FIG. 4 is an enlarged cross-sectional view taken long line 4—4 of FIG. 3;

FIG. 5 is a front plan view of a second preferred embodiment of the assembly of the present invention showing the frame parts in the proximate position in solid and in the remote position in phantom;

FIG. 6 is a top plan view of the embodiment of the invention shown in FIG. 5;

FIG. 7 is an enlarged cross-sectional view taken along line 7—7 of FIG. 6; and

FIG. 8 is an enlarged cross-sectional view taken along line 8—8 of FIG. 7.

As seen in the drawings, the present invention includes first and second frame parts, 10 and 12, which are substantially mirror images of each other. Each frame part 10, 12 includes a lens retaining portion 14, 16 respectively formed of a metal or plastic frame 18, 20 respectively at least partially surrounding a light attenuating lens 22, 24 respectively. Each frame 18, 20 carries a set (two or more) spaced, eyeglass engaging "L" shaped prongs 26, 28 and 30, 32, respectively, adapted to secure the assembly to eyeglasses 33. The prongs are preferably plastic or rubber coated.

Each frame part 18, 20 has a bridge element 34, 36, respectively, which is joined to and extends from the top of the frame part. Bridge elements 34, 36 are connected by a spring mechanism, generally designated 38. Mechanism 38 includes a cylindrical enclosure 40 a tapered end parts 42, 44, respectively. As best seen in FIG. 3, bridge element 34 extends through an opening in end part 42 and into the interior of enclosure 40. The end of bridge element 34 carries a protrusion 46. Protrusion 46 extends in a direction generally perpendicular to the axis of the bridge element and is slidably received within a slot 48 along the bottom of enclosure 40, as seen in FIG. 4. Protrusion 46 and slot 48 cooperate to maintain proper alignment between the frame parts. A coil spring 50 is situated around bridge element 34, operably interposed between protrusion 46 and the interior surface wall 41 of tapered end part 42. In this embodiment, bridge element 36 is fixed to tapered end piece 44 of enclosure 40.

The second preferred embodiment of the invention is illustrated in FIGS. 4 through 8. The major difference between the first preferred embodiment and the second preferred embodiment is that the second embodiment employs two smaller coil springs 53 and 54 instead of one large spring. Here, the portion of bridge element 34 received within enclosure 40 is smaller and the end part 44 of the enclosure is open such that a portion of bridge element 36 may be received within the interior of enclosure 40. See FIG. 7.

The end of bridge element 36 carries oppositely extending protrusions 52 which extend in a direction generally perpendicular to the axis of the bridge element. Protrusions 52 are received within slots 48 and 49 in enclosure 40. See FIG. 8.

Second coil spring 54 is situated around bridge element 36 and operably interposed between oppositely extending protrusions 56 on the end of element 36 and the interior surface wall 45 of enclosure end part 44'. Protrusions 56 cooperate with and are slideably received within slots 48 and 49, respectively, in the same manner as protrusions 52. The protrusions and slots cooperate to maintain proper alignment between the frame parts.

Both embodiments function in the same manner. The spring mechanism 38 permits the user to grasp frame parts 10, 12 and to move them to a remote position, phantom in FIGS. 1 and 5, against the action of the springs, such that prongs 26, 28 and 30, 32 fit around the eyeglass frame. When released, the spring action of mechanism 38 causes the frame parts to move toward each other, so as to retain the eyeglass frame between the prongs, as seen in FIGS. 2 and 6. The prongs may be plastic or rubber coated so as not to scratch the eyeglass frames.

It will now be appreciated that the present invention relates to an enclosed spring bridge mechanism for mounting a sunglass assembly on eyeglasses without contacting or damaging the eyeglass lenses. Opposing frame parts with sets of prongs are moved apart to permit insertion of the eyeglass frame therebetween and then released to permit the spring force to move the parts together to retain the frame. The bridge mechanism includes a cylindrical enclosure within which the springs are situated.

While only a limited number of preferred embodiments have been disclosed for purposes of illustration, it should be obvious that many modifications and variations could be made thereto. It is intended to cover all of these modifications and variations which fall within the scope of the invention, as defined by the following claims:

I claim:

1. A clip-on sunglass assembly for mounting on eyeglasses comprising first and second frame parts, each of said frame parts comprising a lens retaining portion, at least one eyeglass engaging prong and a bridge element; and means for connecting said bridge elements for movement between a proximate position, wherein said frame parts are relatively close to each other, and a remote position, wherein said frame parts are relatively far from each other, said connecting means comprising a substantially cylindrical enclosure having at least one open end through which said bridge element of said first part is received, a spring situated within said enclosure, operably interposed between said bridge element of said first part and the wall of said enclosure, said spring normally biasing said frame parts towards said proximate position and means for attaching said bridge element of said second part to said enclosure.

2. The assembly of claim 1 wherein said attaching means comprises an opening in said other end of said enclosure into which said bridge element of said second part is received and a second spring situated within said enclosure, said second spring being operably interposed between said bridge element of said second part and said enclosure.

3. The assembly of claim 2 wherein said other open end of said enclosure is tapered and said second spring abuts said tapered end.

4. The assembly of claim 1 wherein said one open end of said enclosure is tapered and said spring abuts said tapered end.

5. A clip-on sunglass assembly for mounting on eyeglasses comprising first and second frame parts, each frame part comprising a lens retaining portion, at least one eyeglass engaging prong and a bridge element; and means for connecting said bridge elements for movement between a proximate position, wherein said frame parts are relatively close to each other, and a remote position, wherein said frame parts are relatively far from each other, said connecting means comprising a substantially cylindrical enclosure having open ends through which said respective bridge elements are received, a first spring situated within said enclosure, operably interposed between said bridge element of said first part and the wall of said enclosure and a second spring situated within said enclosure, operably interposed between said bridge element of said second part and the wall of said enclosure, said springs normally biasing said frame parts towards said proximate position.

6. A clip-on sunglass assembly for mounting on eyeglasses comprising first and second frame parts, each of said frame parts comprising a lens retaining portion, at least one eyeglass engaging prong and a bridge element; and means for connecting said bridge elements for movement between a proximate position, wherein said frame parts are relatively close to each other, and a remote position, wherein said frame parts are relatively far from each other, said connecting means comprising a substantially cylindrical enclosure having at least one open end through which said bridge element of said first part is received, a spring situated within said enclosure, operably interposed between said bridge element of said first part and the wall of said enclosure, said spring normally biasing said frame parts towards said proximate position and means for attaching said bridge element of said second part to said enclosure, wherein said enclosure has a slot, said bridge element of said first part has an end and said end has a protrusion which extends into said slot.

7. The assembly of claim 6 wherein said spring is situated between said protrusion and said enclosure.

8. A clip-on sunglass assembly for mounting on eyeglasses comprising first and second frame parts, each of said frame parts comprising a lens retaining portion, at least one eyeglass engaging prong and a bridge element; and means for connecting said bridge element for movement between a proximate position, wherein said frame parts are relatively close to each other, and a remote position, wherein said frame parts are relatively far from each other, said connecting means comprising a substantially cylindrical enclosure having at least one open end through which said bridge element of said first part is received, a spring situated within said enclosure, operably interposed between said bridge element of said first part and the wall of said enclosure, said spring normally biasing said frame parts towards said proximate position and means for attaching said bridge element of said second part to said enclosure, wherein said attaching means comprises an opening in said other end of said enclosure into which said bridge element of said second part is received and a second spring situated within said enclosure, said second spring being operably interposed between said bridge element of said second part and said enclosure and wherein said enclosure has a slot, said bridge element of said first part has an end and said end has a protrusion which extends into said slot.

9. The assembly of claim 8 wherein said enclosure has a second lot, wherein said bridge element of said first part has an end with a second protrusion which extends into said second slot.

10. The assembly of claim 9 wherein said bridge element of said second part has an end and said second spring is situated between said end of said bridge element of said second part and said enclosure.

11. A clip-on sunglass assembly for mounting on eyeglasses comprising first and second frame parts, each frame part comprising a lens retaining portion, at least one eyeglass engaging prong and a bridge element; and means for connecting said bridge element for movement between a proximate position, wherein said frame parts are relatively close to each other, and a remote position, wherein said frame parts are relatively far from each other, said connecting means comprising a substantially cylindrical enclosure having open ends through which said respective bridge elements are received, a first spring situated within said enclosure, operably interposed between said bridge element of said first part and the wall of said enclosure and a second spring situated within said enclosure, operably interposed between said bridge element of said second part and the wall of said enclosure, said springs normally biasing said frame parts towards said proximate position, wherein said enclosure has a slot, said bridge element of said first part has an end and said end has a protrusion which extends into said slot.

12. The assembly of claim 11 wherein said first spring is situated between said protrusion and said enclosure.

13. The assembly of claim 12 wherein said bridge element of said second part has an end and wherein said end has a protrusion which extends into said slot.

14. The assembly of claim 13 wherein said second spring is situated between said protrusion on said end of said bridge element of said second part and said enclosure.

15. The assembly of claim 14 wherein said one open end of said enclosure is tapered and said spring abuts said tapered end.

16. The assembly of claim 15 wherein said other open end of said enclosure is tapered and said second spring abuts said tapered end.

17. The assembly of claim 13 wherein said enclosure has a second slot and wherein each of said bridge elements ends has a second protrusion which is received in said second slot.

* * * * *